Figure 1:
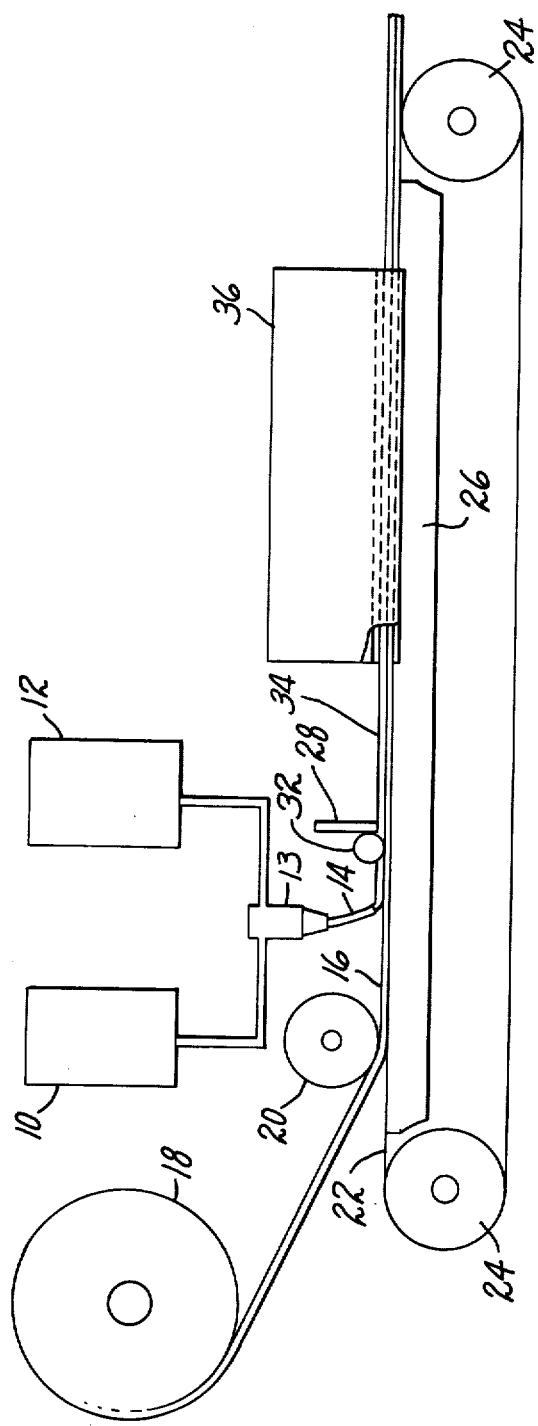

United States Patent [19]
Zemlin

[11] 3,891,785
[45] June 24, 1975

[54] PROCESS FOR FORMING A FLEXIBLE POLYURETHANE COATING

[75] Inventor: John C. Zemlin, Reading, Mass.
[73] Assignee: USM Corporation, Boston, Mass.
[22] Filed: Mar. 20, 1973
[21] Appl. No.: 343,177

[52] U.S. Cl. .................................. 427/359; 427/390
[51] Int. Cl.² ............................................ B44D 1/14
[58] Field of Search .......... 260/22 TN; 117/161 KP, 117/DIG. 7, DIG. 5

[56] References Cited
UNITED STATES PATENTS

| | | | |
|---|---|---|---|
| 3,183,109 | 5/1965 | Neumann et al. | 260/22 TN |
| 3,279,424 | 10/1966 | Brown et al. | 117/161 KP X |
| 3,371,056 | 2/1968 | Delius | 260/22 TN |
| 3,501,425 | 3/1970 | Delius | 260/22 TN |
| 3,539,389 | 11/1970 | Tu | 117/161 KP |
| 3,539,424 | 11/1970 | Tashlick | 117/161 KP X |
| 3,547,848 | 12/1970 | Marsh et al. | 117/161 KP X |
| 3,576,777 | 4/1971 | Neumann et al. | 260/22 TN |
| 3,594,213 | 7/1971 | Rudman | 117/161 KP X |
| 3,763,065 | 10/1973 | Herrmann | 260/22 TN |

FOREIGN PATENTS OR APPLICATIONS

| | | |
|---|---|---|
| 902,836 | 6/1972 | Canada |

Primary Examiner—Cameron K. Weiffenbach
Attorney, Agent, or Firm—Benjamin C. Pollard; Vincent A. White; Richard B. Megley

[57] ABSTRACT

Process for forming polyurethane films and coatings particularly for fabrics in which the coating composition is a mixture including a polyisocyanate and one or more selected diols and diamines which are mixed in controlled proportions and blended, deposited and spread in a controlled sequence to give a film or coating which retains its uniformity against undue penetration as a coating on fabrics and against beading up as a layer on a release sheet when heated to effect cure.

5 Claims, 2 Drawing Figures

Change in viscosity with time for material of Example 1. at various shear rates and at high and low temp.

PROCESS FOR FORMING A FLEXIBLE POLYURETHANE COATING

FIELD OF THE INVENTION

This invention relates to a process for forming a film or a coating for fabric and particularly to a process in which a curing-type polyurethane is caused to associate in a special way with a fabric backer.

BACKGROUND OF THE INVENTION

Coating of fabrics with urethanes at the present time is primarily done with solvent solutions of coating resins. Such coating resins are high molecular weight, fully reacted, thermoplastic urethane. In direct coating, the resin solution, a viscous liquid, is applied directly to the fabric usually with a "knife." Usually, several light coatings, followed by passage each time through a drying oven are applied in sequence. This is necessary to prevent excessive strike through which would produce a very "boardy" hand in the fabric. Also, thin coats are needed to allow complete solvent evaporation from each layer before the next is applied. Solvents used are most often dimethylformamide, tetrahydrofurane, MEK and the like or mixtures of these, and the time, controls and handling needed to provide the multiple coatings add expense to the process. Moreover, particularly with emphasis on ecology, more stringent precautions have been required as regards escape of solvent in the atmosphere.

Transfer coating of polyurethane involves applying the coating solution to a patterned or embossed release paper. Heavier coatings can be applied to the paper although again they are limited by the necessity of obtaining complete release of solvent for recoating. Typically, the process involves forming a first coating on release paper, drying it, coating the surface of the first deposited coating with a second coating (usually an adhesive coating) and before substantial drying occurs, combining the fabric with the adhesive layer by passing the assembly between rolls.

As in the direct coating process, transfer coating process involves the high cost of solvents, the hazards associated with solvent use and the problem of exhausting the solvents.

OBJECT OF THE INVENTION

It is an object of the present invention to provide a coating or film forming process which uses solvent-free, two-part liquid urethane systems capable of forming a substantial layer in a single pass without objectionable penetration or loss of uniformity.

DRAWINGS

Figure 2:
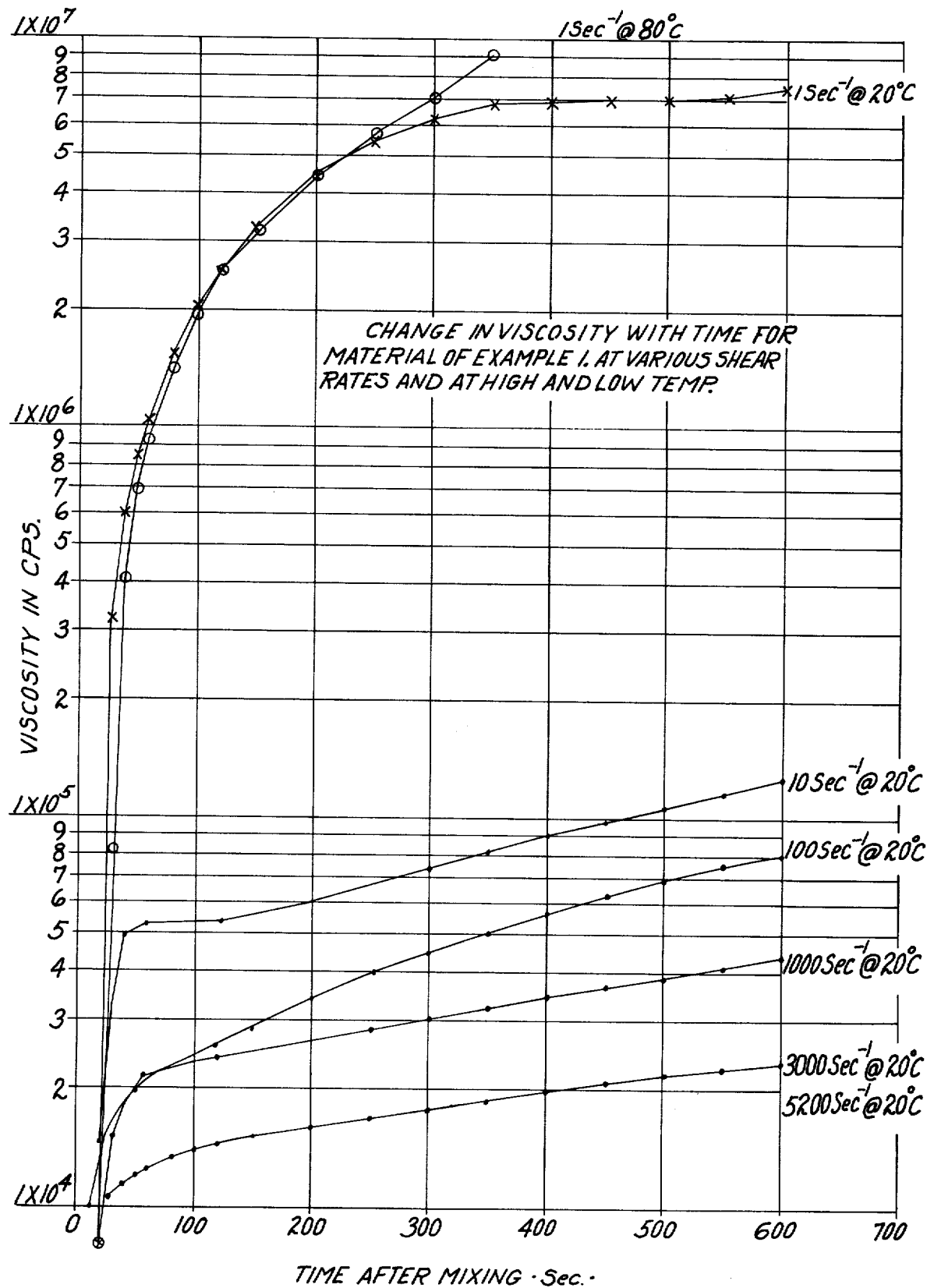

The invention will be described in connection with the drawings forming part of the disclosure in which:

FIG. 1 is a diagrammatic elevational view of a useful combination and arrangement of apparatus for carrying out the process; and FIG. 2 is a curve drawn to logarithmic coordinates of development of viscosity in the reactive composition used in the present process at various shear rates and temperatures.

DESCRIPTION OF THE INVENTION

In accordance with the present invention I have provided a continuous process for forming a flexible polyurethane coating or film in which process the reagents for forming the coating or film are liquid materials reactive to form a pseudoplastic intermediate stage material prior to final curing. These reactive liquids are mixed continuously and the freshly formed mixture is continuously blended with a mass of earlier mixed material maintained fluid by shearing agitation. Portions of the agitated mass are continuously withdrawn to control the size of the mass such that the dwell of reactive mix in the mass is short enough before withdrawal that the mass does not set up nor thicken to prevent spreading, but is long enough that portions of the mix withdrawn include partially insoluble components. Withdrawn portions of the mass are spread in a layer and thicken directly after spreading to a condition where heating to effect cure does not cause undesired flow. The reaction mixture for forming the polyurethane includes a polyol, a polyisocyanate, a controlled amount of a reactive amine and usually a catalyst for the urethane forming reactions. It appears that the amine reacts rapidly with the isocyanate to form semi-insoluble centers which may serve to produce a gel structure and give the desired pseudoplastic character to the reaction mixture at an early stage in the process.

Polyol components for reaction in the process are preferably those having molecular weights of from about 500 to about 3,000 and may be —OH terminated polyesters from reaction of one or more glycols, such as polyethylene glycol, tetramethylene glycol or polypropylene glycol with one or more dibasic acids, such as adipic acid, sebacic acid, azelaic acid, dimer acid and others, —OH terminated polylactones such as the product of reacting and polymerizing caprolactone with ethylene oxide or propylene oxide and hydroxyl terminated polybutadiene based polymers and mixtures of these. Polyalkylene ether glycols such as polypropylene ether glycol have been used but have not been found as satisfactory as the polyester or polylactone glycols. Triols may be used in amounts limited to those which will not interfere with the flexibility and extensibility of the final product.

Any of the usual polyisocyanates such as aromatic, cycloaliphatic or aliphatic diisocyanates may be used, for example 2,4,- and 2,6-tolylene diisocyanates and mixtures of these, 4,4'-diphenylmethane diisocyanate, hydrogenated 4,4'-diphenylmethane diisocyanate, isophorone diisocyanate, alkylene diisocyanates and others. Aryl and cycloaliphatic diisocyanates are preferred and 4,4'-diphenylmethane diisocyanate has been found particularly satisfactory.

In general, it has been found desirable for convenience in mixing to combine the isocyanate with the polyol material as a prepolymer or more preferably as a quasiprepolymer before forming the reaction mixture to be spread as a coating or film. Quasiprepolymers in which there is a greater than 2:1 excess of —NCO groups over groups containing active hydrogen have lower viscosity than simple —NCO terminated prepolymers; and quasiprepolymers having a reactive —NCO content of from 12 to 25 precent by weight have been found to have particularly satisfactory low viscosities which enable the rapid and complete mixing which is important for fast reacting systems most useful in the present process.

Most of the amines useful in the present reaction mixture are difunctional and may be aromatic, aliphatic or alicyclic but must be selected to be compatible with other components, particularly the polyol component of the reaction mixture to enable intimate mixture of the reagents before precipitation and gelation reaction occurs to a significant extent. This depends on the capability of the mixing equipment and on the speed of reaction between the —NCO and the amines. Aromatic amines have been found to be the slowest in reaction and ordinarily in these, the amine groups must be primary. Aliphatic and cycloaliphatic amines may have either primary amine groups or secondary amine groups, but steric hindrance is a factor which must be considered in determining whether the reaction of the secondary amine groups in the amines is sufficiently high. Preferred amines are methylenedianiline and isophorone diamine but other useful amines include o-toluidene, 1,4-diamino benzene, o-dianisidine, xylylene diamine, hexamethylene diamine, 1,4-cyclohexane bis methylamine, piperazine, o-anisidine, cyclo hexyl amine, imino bis propylamine and benzylamine. To secure the desired action of the amine, the amine will be employed in amount of from about 5 to about 35 percent on an equivalent basis, i.e. on the basis of the percent of isocyanate equivalents reactable by the amine groups. The amines are usually mixed with a diol chain extender for combination with the polyisocyanate component, e.g. the prepolymer or quasiprepolymer, to form the ultimate reaction mixture. The chain extender may be the same as the polyol above discussed or may be lower molecular weight material such as butane diol, cyclohexanedimethanol, diethylene glycol, ethylene glycol, triethanolamine, dichlorobenzidine, methylene bis diphenyl, 3,3'-dimethoxy 4,4'-diamine, 4,4'-methylene bis (2-chloroaniline). The diol chain extender, if used, will be incorporated in amount to supply active hydrogen which taken with the active hydrogen of the amine will be approximately equivalent to the reactive —NCO groups in the ultimate reaction mixture. The addition of various fillers, pigments, extenders, antioxidants, lubricants and other additives well known in the art is also contemplated.

In carrying out the coating or film-forming process, it is convenient to use an assembly of apparatus such as shown diagrammatically in FIG. 1. Using the apparatus, liquid reactive —NCO-containing component, for example a quasiprepolymer is placed in container 10 and the liquid amine-containing component is placed in container 12. It is preferred to use components which are liquid at room temperature, but if elevated temperatures are required, the containers 10 and 12 may be heated. Liquid is drawn continuously from containers 10 and 12, rapidly mixed in the mixer and supplied continuously through the conduit 14 for deposition on a continuously moving surface 16. In the apparatus shown, this surface 16 is a backing fabric which may be woven or non-woven which is drawn from supply roll 18, passes under the roll 20 and is laid down on the driven belt 22. The backing fabric is wet by the applied mixture for forming a permanent coating; but it will be understood that a release carrier may be used in place of such fabric for casting a film which will later be stripped from the carrier. As shown, the belt 22 is driven by the rolls 24, passes over a supporting surface 26 in spaced relation to a knife member 28.

Freshly mixed material is carried by the surface 16 to the knife member 28 where a rolling bank 32 of the reaction mixture is maintained. Active shearing agitation is created in the bank 32 by the action of the surface 16 moving forward and tending to move the bank 32 forward and the action of the knife 28 in holding back portions of the bank 32 spaced from the moving surface 16. The knife member 28 limits the amount of mixture carried forward by the surface 16 and spreads the mixture as a film or layer 34 on the surface 16.

The surface 16 with the layer 34 of mixture thereon is carried by belt 22 through the heating chamber 36 where the reaction mixture of layer 34 is cured. The cured layer 34 leaving the chamber 36 may be removed from belt 22 along with surface 16 and stored in sheets or rolls.

An important property of the reaction mixture of polyol, polyisocyanate and amine is that of pseudoplasticity particularly the development of extremely high viscosity at shear rates approaching zero and major reduction of viscosity or resistance to flow when the rate of shear is increased. FIG. 2 is a curve of viscosity plotted against shear rate for the reaction mixture of the present invention. As there shown, when the shear rate is very low, i.e. 1 sec.$^{-1}$ or less, as in the material deposited on the moving surface before reaching the rolling bank, or in the material passing to and through the curing oven the viscosity may be over one million centipoises within about 60 sec. after mixing, so that the mixture will not dive into openings and porosities existing in the moving surface. However, in the rolling bank where a rough calculation shows the shear rate to be about 12 sec.$^{-1}$ for a bank size of about 2 inches and a speed of the carrier of about 60 feet per minute, the viscosity is only 50,000 centipoises 100 sec. after mixing. At the relatively low viscosity existing in the rolling bank because of the shearing action, freshly mixed material from the moving surface is taken up into the rolling bank and blended with the material in the bank which has had a longer time for reaction and this blend is spread over the width of the moving surface and metered as a uniform layer on the surface by the action of the knife. Under the very much higher shear conditions at the knifing process, estimated at 3,7000 sec.$^{-1}$, the viscosity drops to about 15,000 centipoises where the knife setting is at 0.004 inch above the moving surface and average mixed age is 200 sec. The time of engagement between the moving surface and the relatively low viscosity material in the agitated bank is brief so that while good surface wetting of the moving surface is obtained there is substantially no penetration or diving of the reaction mixture into any pores or openings in the surface.

When shearing agitation of the blend ceases, that is, in the undisturbed coating on the moving surface after passing the knife, the resistance to flow of the blend increased directly to a viscosity in the millions of centipoises so that there is no diving of the blend into pores or openings. In like manner, if the moving surface is an impervious release sheet, the greatly increased flow resistance of the blend after leaving the knife prevents beading or rupture of the layer of reactive blend caused by surface tension.

This coating is carried forward by the surface into the heating zone shown as an oven through which the belt moves the surface. It has been found that even at temperatures as high as 150°C. in this heating zone, no diving of the coating composition into the fabric or beading up or development of irregularities in a coating on a release sheet occurs.

To secure this advantageous reaction it is important that the initial reagents have relatively low viscosities of the order from about 500 to about 30,000 centipoises for rapid and complete mixing and that the amount of amine and the rate of reaction of the mixture be such that a viscosity of at least 1,000,000 centipoises at shear rates approaching zero be reached in less than about 100 seconds. The amount of amine must be limited so that when subjected to shear rates of the order of 5 to 50 sec.$^{-1}$, the viscosities will fall by reason of the pseudoplastic character of the reaction mixture to under about 100,000 centipoises. To secure shear rates in this range through reduction of viscosity, rolling banks of from about ½ to about 2 inches in diameter are used. It has been calculated that where the surface carrying the reaction mixture is moving past the spreader knife at 5 yards per minute, the shear rate will be about 3 sec.$^{-1}$ for a 2 inch bank, 6 sec.$^{-1}$ for a 1 inch bank and 12 sec.$^{-1}$ for a ½ inch bank and that when the surface is moving at 15 yards per minute, the shear rate will be about 9 sec.$^{-1}$ for a 2 inch bank, 18 sec.$^{-1}$ for a 1 inch bank and 36 sec.$^{-1}$ for a ½ inch bank. The smaller banks have greater shearing action than the larger and also the mass of the larger banks both provides a longer average residence of mixture in the bank and also accumulates heat of reaction tending to accelerate the reaction of components in the bank. The size of the bank, which is controlled by controlling the rate of supply of fresh mix relative to the rate of withdrawal of mix as coating, must be maintained between an upper limit of a size at which the average reaction proceeds to a level at which viscosity becomes so great that fresh mixture is not taken up in the bank and the mixture may even solidify on the one hand, and a size so small that effective spreading is not attained on the other. Additionally, rolling banks should not be so small as not to allow advance of the average stage of reaction to the extent desired to give optimum resistance to flow in the final heated curing stage.

The following examples are given as an aid in understanding the invention but it is to be understood that the invention does not relate particularly to the special times, temperatures, materials, conditions, etc.

EXAMPLE 1

A quasiprepolymer was prepared by mixing 16.7 grams of an —OH terminated polyester having a molecular weight of 3,000 from reaction and condensation of adipic acid with a mixture of equal parts of polyethylene glycol and polypropylene glycol, 83.3 parts of liquid methylene diphenylene diisocyanate at a temperature of 60°C. for 5 hours and storing for 1 week at room temperature. This quasiprepolymer had an —NCO content of 21.2 percent by weight providing 0.504 equivalent of —NCO. This is the first part for combination to form a coating on fabric.

The second part for mixture to form the coating was prepared by mixing 539 grams of the same polyester, 9.5 grams of methylene dianiline, 6.6 parts of antioxidant, 1.9 grams of phenyl mercury propionate and 30 grams of a pigment, the mixing being carried out at 90°C. for 1 hour after which the mixture was cooled at room temperature.

The two above reactive parts were mixed at room temperature with intensive agitation in a continuous mixer and the mixture was discharged continuously through a conduit to a spreader nozzle and deposited on a plain weave nylon weighing 2½ ounces per square yard and having a denier of 210. The fabric was moved forward at 15 yards per minute carrying the deposited material to a knife spreader set at 6 mils above the surface of the fabric. The deposited material collected in front of the knife as a bank and the rate of feed of the mixture to the fabric was controlled to form a rolling bank of about 1 inch in diameter.

In the 1 inch rolling bank and at a coating speed of 15 yards per minute, the shear rate was calculated to be 13 sec.$^{-1}$. The estimated viscosity at this shear rate was about 50,000 centipoises at which viscosity good mixing of the fresh material and the material already in the bank occurred. The coating on the fabric after passing the knife was 3 mils in thickness due to necking down of the material as the coating was drawn under the knife. The shear rate, under the knife condition, was estimated to be 1,500 sec.$^{-1}$. At this shear rate, the estimated viscosity was about 20,000 centipoises so that the mixture both spread effectively on the fabric and wetted the fibers of the fabric, but did not penetrate through the thickness of the fabric prior to increase of viscosity on termination of shear. Within 2 seconds after the coated fabric had passed the knife it entered an oven set at 100°C. and was maintained in this oven for 5 minutes. On exit of the coated fabric it was found that the coating had not dived through the fabric. The coating fabric was cooled and could be rolled up at this point.

The coating formed was tough and flexible and could not be separated from the fabric without distruction of the fabric.

A portion of the composition leaving the mixer was deposited on the plate of a Haake plate and cone viscosimeter and the viscosity determined at 25°C. and at a shear rate of 0.1 sec.$^{-1}$. The curve showed development of high viscosity, in excess of 1,000,000, within 100 seconds.

EXAMPLE 2

The procedure of Example 1 was repeated with the exception that the second part for mixture to form the coating was a combination of 360 grams of a polyester of diethylene glycol and adipic acid having a molecular weight of 2,000, 9.5 grams of methylene dianiline, 6.6 parts of antioxidant, 1.9 grams of phenyl mercury proprionate and 30 grams of pigment, the mixing being carried out at 90°C. for hour after which the mixture was cooled to room temperature.

The final physical properties of the coating were similar to those of Example 1 except that the coating was harder and demonstrated improved abrasion resistance and better resistance to aromatic hydrocarbon swelling but was stiffer with less drape than the product coated according to Example 1.

EXAMPLE 3

A quasiprepolymer was prepared by combining 0.077 moles of a polyester from diethylene glycol and adipic acid having a molecular weight of 3,000 with one mol of methylene diphenylene diisocyanate. The resulting quasiprepolymer had a free —NCO content of 15 percent and a viscosity at 25°C. of 8,300 centipoises.

The second part for mixture had a composition the same as that of Example 1 except that 539 grams of the polyester from diethylene glycol and adipic acid used in part 1 of this Example 3 was used rather than the copolyester of Example 1.

This part 2 is combined with 142 grams of the above quasiprepolymer (part 1) and is coated on a nylon fabric and cured using the procedure of Example 1. The product was comparable to that of Example 1 but a little softer. A portion of the composition leaving the nozzle was tested in the viscosimeter at a shear rate of 0.1 sec.$^{-1}$ and found to be in excess of 1,000,000 centipoise 60 seconds after mixing of the 2 parts.

EXAMPLE 4

The procedure of Example 3 was repeated except that 8.3 grams of isophorone diamine were substituted for the 9.5 grams of methylene dianiline used in that example.

The properties of the resulting coated sheet material were essentially the same as those of the product of Example 3.

EXAMPLE 5

The mixing and coating process of Example 1 was repeated except that 20 grams of cyclohexylamine were substituted for the 9.5 grams of methylene dianiline and that 111 grams of the quasiprepolymer (part 1) were used rather than the 100 grams used in Example 1.

The resulting coated product was softer and more flexible and had better drape than the product of Example 1.

EXAMPLE 6

A quasiprepolymer was prepared by mixing 16.7 grams of the —OH terminated polyester of Example 1 with 41.7 grams of methylene diphenylene diisocyanate and 29.2 grams of tolyene diisocyanate at a temperature of 60° for 5 hours and storing for 1 week at room temperature. 87.6 grams of the above quasiprepolymer (part 1) were combined with the part 2 of Example 1 in a continuous mixer and the mixture was coated on nylon fabric and cured following the procedure of Example 1.

This mixture processed well in the coating and curing procedures; and it was found that the viscosity at shear rate of 0.1 sec.$^{-1}$ at 60 seconds after mixing was in excess of 1,000,000 cps.

EXAMPLE 7

The procedure of Example 1 was repeated with the substitution of 38.2 grams of mixed 2,2 and 2,6 tolyene diisocyanate for the methylene diphenylene diisocyanate employed in Example 1. 74.9 grams of the quasiprepolymer so obtained was mixed with the part 2. The resulting mixture required a longer period for reaching the desired viscosity of 1,000,000 at shear rate 0.1 sec.$^{-1}$ and prior to adjustment for this fact showed considerable strikethrough of the fabric.

EXAMPLE 8

The procedure of Example 2 was repeated, but in place of the polyester, 360 grams of a polypropylene oxide diol having a molecular weight of 2,000 was employed.

The composition processed satisfactorily and achieved the important viscosity behavior; but the resulting product was much softer and the physical properties of the cured coating were inferior in that they were too soft and much too tacky.

EXAMPLE 9

The procedure of Example 2 was repeated except that 360 grams of polycaprolactone diol having a molecular weight of 2,000 was substituted for the polyester. The polycaprolactone diol had a melting point of 60°C. and because of this high melting point, 1 and 2 were brought to a temperature 60°C. for mixing and auxiliary heating was necessary at the coating knife to prevent freezing of the material in the bank. As a consequence, it was necessary to use a small rolling bank of ½ inch diameter and to introduce the coated fabric to the heated curing oven directly after leaving the coating knife.

The resulting coated product was satisfactory and comparable to that of Example 2.

EXAMPLE 10

A prepolymer was prepared using 157 grams of hydrogenated methylene diphenylene diisocyanate and 150 grams of the 3,000 molecular weight polyester of Example 1. The reaction was carried out at a temperature at 60°C. for 12 hours and the reaction mixture was allowed to stand at room temperature for one week.

The above reaction product (part 1) was combined with a part 2 comprising 450 grams of the same polyester, 57 grams of imino bis propylamine, 76 grams of methylene bis o-chloroaniline and 7 grams of dibutyl tin dilaurate.

After mixing a pseudoplastic state developed within 30 seconds and the mixture coated well onto a silicone treated release paper using a knife setting of 0.006 inch and a bank size of 2 inches. Napped fabric was then lightly pressed onto the coating carrier by the release paper with the napped side adjacent the coating and the resulting assembly after curing at 150°C. for 10 minutes and stripping from the release paper was a very soft fabric backed polyurethane film having a high degree of drape. There were no holes or other visible flaws in the polyurethane which showed that the viscosity had not decreased significantly during heating and curing.

Having thus described my invention, what I claim as new and desire to secure by Letters Patent of the United States is:

1. The process for forming a flexible polyurethane coating or film including the steps of continuously introducing polyurethane-forming reagents from supply containers to a mixing zone under temperature conditions maintaining said reagents in liquid condition, mixing said reagents in said zone, continuously discharging the mixed reagents from said zone as a substantially solvent free liquid continuous stream of a mixture of said reagents, said reagents comprising a polyisocyanate, a difunctional amine in amount equivalent to from about 5 to about 35 percent of the reactive —NCO of said polyisocyanate and a diol having a molecular weight of from about 500 to about 3,000, the reactive hydrogen of said diol and amine being substantially equivalent to the reactive —NCO groups of said polyisocyanate and said mixture being reactive to form a pseudoplastic intermediate stage material having an extremely high viscosity at which it will not dive into porosities on a casting surface at shear rates approaching zero and a very much lower viscosity suitable for blending, spreading and coating under shearing agitation, depositing said stream of mixed reactants on a continuously moving surface whose path leads beneath a spreader element and then through a heated curing zone, said spreader element extending across said surface and being disposed relative to said surface to form a layer on said surface by allowing passage between said element and said surface of a thickness of said mixture on said surface determined by the desired thickness of said coating or film and to hold back passage of mixed reactants on said surface greater than said determined thickness above said surface, reacting successive portions of said mixture of reagents to said pseudoplastic intermediate state while being moved toward said spreader element, collecting on said surface mixed material held back by said spreader element as a bank, the relative movement between said surface and said spreader element creating shearing agitation in and a rolling movement of said bank to provide said lower viscosity state in the material in said bank, continuously incorporating and blending further mixture from said surface into the mass of reactive mixture in said bank, spreading mixture from said bank on said surface by said spreader element, withdrawing portions of the blended material on said surface from the agitated mass in said bank as a layer passing beneath said spreader element while the mass remains spreadable through balance of freshly mixed against previously mixed reagents and does not set up, controlling the size of the agitated mass in said bank by correlation of the rate of supply of the mixture of reagents to said surface and the rate of withdrawal to provide dwell time of reactive mixture in said bank, the viscosity of said mixture in said layer becoming extremely high when the layer has left the spreader element and shearing agitation ceases, and then heating said layer to curing temperature during passage on said surface through said heated curing zone.

2. The process for forming a flexible polyurethane coating on a surface as defined in claim 1 in which said surface is a flexible fibrous backing, said polyisocyanate and diol are reacted in proportions forming a quasiprepolymer having a reactive —NCO content of from about 12 to about 25 percent by weight constituting a first reactive component, a mixture comprising diamine and further diol is a second reactive component, and said first and second reactive components are continuously mixed and deposited as a stream on said fibrous backing, the deposition on said fibrous backing being carried out when said mixture of reagents has developed a viscosity under substantially zero shear rate of at least about $1 \times 10^6$ centipoises.

3. The process for forming a flexible polyurethane coating on a surface as defined in claim 2 in which said bank is maintained at a diameter of from about ½ to about 2 inches coordinated with the rate of movement of said surface relative to said spreader element to provide shearing agitation at a shear rate of the order of 5 to 50 sec.$^{-1}$ in said bank to reduce the viscosity of the material in the bank to under about 100,000 centipoises for spreading.

4. The process for forming a flexible polyurethane film as defined in claim 1 in which said surface is a smooth impervious release sheet, said polyisocyanate and diol are reacted in proportions forming a quasiprepolymer having a reactive —NCO content of from about 12 to about 25 percent by weight constituting a first reactive component, said first and second reactive components are continuously mixed and deposited as a stream on said release sheet, the deposition on said release sheet being carried out when said mixture of reagents has developed a viscosity under substantially zero shear rate of at least about $1 \times 10^6$ centipoises and the cured layer being stripped from said release sheet after leaving said heated curing zone.

5. The process for forming a flexible polyurethane film as defined in claim 4 in which said bank is maintained at a diameter of from about ½ to about 2 inches coordinated with the rate of movement of said surface relative to said spreader element to provide shearing agitation at a shear rate of the order of 5 to 50 sec.$^{-1}$ in said bank to reduce the viscosity of the material in the bank to under about 100,000 centipoises for spreading.

* * * * *